(12) United States Patent
Venkataraman et al.

(10) Patent No.: US 8,732,654 B2
(45) Date of Patent: May 20, 2014

(54) DEPENDENCY-BASED IMPACT ANALYSIS USING MULTIDIMENSIONAL MODELS OF SOFTWARE OFFERINGS

(75) Inventors: Ramkumar Venkataraman, Foster City, CA (US); Jerome Labat, San Carlos, CA (US); John Eugene Edward, Fremont, CA (US); Ramachandran Varadharajan, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 350 days.

(21) Appl. No.: 13/118,962

(22) Filed: May 31, 2011

(65) Prior Publication Data
US 2012/0311523 A1    Dec. 6, 2012

(51) Int. Cl.
*G06F 9/44* (2006.01)
*G06F 17/30* (2006.01)

(52) U.S. Cl.
CPC .... *G06F 17/30592* (2013.01); *G06F 17/30589* (2013.01); *G06F 17/30595* (2013.01); *G06F 17/30607* (2013.01)
USPC .......................................... 717/104; 717/103

(58) Field of Classification Search
CPC ..................................................... G06F 17/30
USPC ................................. 717/101–105, 120–121
See application file for complete search history.

(56) References Cited

U.S. PATENT DOCUMENTS 7,933,762 B2    4/2011 Pinto et al.
2005/0166094 A1    7/2005 Blackwell et al.

FOREIGN PATENT DOCUMENTS

KR    1020040024919 A    3/2004

OTHER PUBLICATIONS

Christian Pich, "Applications of Multidimensional Scaling to Graph Drawing", 2009, retrieved from http://nbn-resolving.de/urn-:nbn:de:bsz:352-opus-83992, pp. i-x, 1-139.*
Alhazbi et al., "Dependencies Management in Dynamically Updateable Component-Based Systems", 2007, Science Publications, http://thescipub.com/abstract/10.3844/jcssp.2007.499.505, pp. 499-505.*
Sengal et al., "Using Dependency Models to Manage Complex Software Architecture", 2005, ACM, pp. 167-176.*
Kohring, "Complex Dependencies in Large Software Systems", Sep. 2009, NEC Laboratories Europe, Germany, 24 pages.*
Lecture Notes, "Lecture 23: All-Pairs Shortest Paths", Apr. 1998, Computer Science, University of Maryland, http://www.cs.umd.edu/~meesh/351/mount/lectures/lect23-allpairs-shortest-path.pdf, pp. 69-73.*
Pierre Bourqie et al., "Proposed Concepts for a Tool for Multidimensional Performance Modeling in Software Engineering Management", IEEE ISIE, Jul. 9-12, 2006, pp. 3252-3257.

* cited by examiner

*Primary Examiner* — Ted T Vo
(74) *Attorney, Agent, or Firm* — Park, Vaughan, Fleming & Dowler LLP; Chia-Hsin Suen

(57) ABSTRACT

The disclosed embodiments provide a system that facilitates the maintenance and execution of a software offering. During operation, the system obtains model data associated with a multidimensional model of the software offering. Next, the system uses the model data to calculate a set of dependency scores representing levels of dependency among a set of service components and a set of resources used by the software offering. Finally, the system uses the dependency scores to facilitate management of the software offering.

12 Claims, 5 Drawing Sheets

DEPENDENCY-BASED IMPACT ANALYSIS USING MULTIDIMENSIONAL MODELS OF SOFTWARE OFFERINGS

RELATED APPLICATION

The subject matter of this application is related to the subject matter in a co-pending non-provisional application by inventors Jerome Labat, Ramachandran Varadharajan, Wilson Lau, and Thomas Bishop, entitled "Multidimensional Modeling of Software Offerings," having Ser. No. 13/031,950, and filing date Feb. 22, 2011.

The subject matter of this application is also related to the subject matter in a co-pending non-provisional application by inventors Jerome Labat, Ramachandran Varadharajan, Wilson Lau, and Thomas Bishop, entitled "Automatic Provisioning of Resources to Software Offerings," having Ser. No. 13/031,968, and filing date Feb. 22, 2011.

BACKGROUND

Related Art

The present embodiments relate to techniques for managing software offerings. More specifically, the present embodiments relate to dependency-based impact analysis of the software offerings using multidimensional models of the software offerings.

Recent computing trends have shifted the processing and consumption of data and services to cloud computing systems. Such cloud computing systems allow software providers to deploy, execute, and manage software offerings on shared infrastructure resources such as servers, network equipment, platform-virtualization software, and/or datacenter space. Furthermore, such resources may be dynamically provisioned and/or scaled, thus enabling consumption of the resources as services.

For example, a cloud computing provider may provide virtualized storage, network, and/or computing resources to multiple cloud computing customers. The cloud computing customers may deploy software offerings on the virtualized resources and pay the cloud computing provider only for resources consumed by the software offerings. As a result, the cloud computing customers may avoid capital expenditures associated with purchasing, setting up, and/or managing the underlying hardware and software. Furthermore, the centralization and sharing of infrastructure resources may improve the resources' utilization rates and management overhead.

Hence, the deployment, execution, and management of software offerings may be facilitated by mechanisms for dynamically allocating, configuring, and monitoring infrastructure resources used by the software offerings.

SUMMARY

The disclosed embodiments provide a system that facilitates the maintenance and execution of a software offering. During operation, the system obtains model data associated with a multidimensional model of the software offering. Next, the system uses the model data to calculate a set of dependency scores representing levels of dependency among a set of service components and a set of resources used by the software offering. Finally, the system uses the dependency scores to facilitate management of the software offering.

In some embodiments, the system also obtains an update to the multidimensional model and recalculates the dependency scores based on the update.

In some embodiments, using the model data to calculate the set of dependency scores involves calculating a set of centrality scores for a set of nodes in the multidimensional model, and using the set of centrality scores as the set of dependency scores.

In some embodiments, calculating the set of centrality scores for the set of nodes in the multidimensional model involves:
  (i) obtaining an adjacency matrix for the set of nodes;
  (ii) calculating an eigenvector associated with a greatest eigenvalue of the adjacency matrix; and
  (iii) obtaining the centrality scores from a set of elements in the eigenvector.

In some embodiments, the eigenvector is calculated using at least one of an iterative technique and an algebraic technique.

In some embodiments, using the dependency scores to facilitate management of the software offering involves at least one of using the dependency scores to determine a set of recovery costs associated with the service components and the resources, and using the dependency scores to determine a recovery sequence for the software offering.

In some embodiments, the recovery sequence corresponds to a decreasing sequence of the dependency scores.

BRIEF DESCRIPTION OF THE FIGURES

In the figures, like reference numerals refer to the same figure elements.

DETAILED DESCRIPTION

Figure 1:
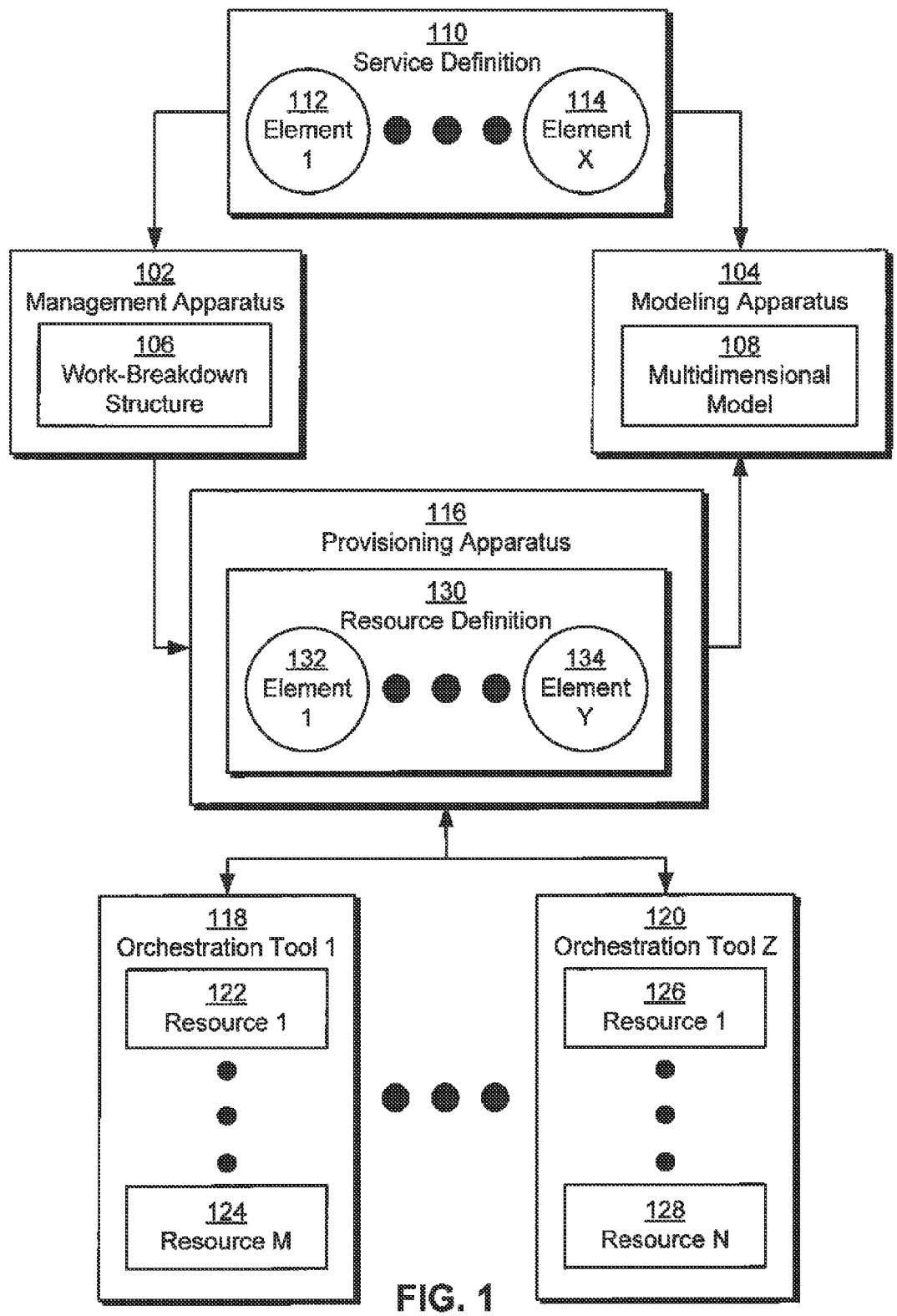
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating the maintenance and execution of a software offering. The software offering may correspond to an application that is deployed on one or more servers and accessed over a network connection. For example, the software offering may provide a web application, distributed application, and/or web service to users of the software offering.

More specifically, the disclosed embodiments provide a method and system for dependency-based impact analysis of the software offering using a multidimensional model of the software offering. The multidimensional model may include a set of service components in the software offering, a set of resources used by the software offering, and a set of dependencies among the service components and/or resources. The multidimensional model may thus facilitate the deployment, execution, and maintenance of the software offering.

To perform the dependency-based impact analysis, model data associated with the multidimensional model may be obtained and used to calculate a set of dependency scores representing levels of dependency among a set of service components and a set of resources used by the software offering. The dependency scores may be calculated as a set of centrality scores for a set of nodes in the multidimensional model. For example, the centrality scores may be calculated by obtaining an adjacency matrix for the set of nodes, calculating an eigenvector associated with a greatest eigenvalue of the adjacency matrix, and obtaining the centrality scores from a set of elements in the eigenvector. The dependency scores may thus represent the importance of the nodes with respect to the connections between the nodes in the multidimensional model.

The dependency scores may then be used to facilitate management of the software offering. First, the dependency scores may be used to determine a set of recovery costs associated with the service components and the resources. For example, the recovery cost of a service component and/or resource may be proportional to the dependency score associated with the service component and/or resource. The dependency scores may also be used to determine a recovery sequence for the software offering. For example, the recovery sequence may correspond to a decreasing sequence of the dependency scores to prioritize the restoration of service components and/or resources associated with higher levels of dependency.

FIG. 1 shows a schematic of a system in accordance with an embodiment. As shown in FIG. 1, the system includes a management apparatus 102, a modeling apparatus 104, and a provisioning apparatus 116. Each of these components is discussed in further detail below.

In one or more embodiments, the system of FIG. 1 is used to manage the deployment and execution of a software offering on a set of resources (e.g., resource 1 122, resource m 124, resource 1 126, resource n 128). The software offering may correspond to a software program that performs tasks for a set of users. For example, the software offering may allow the users to collaborate on projects, file income taxes, manage personal or small business finances, and/or perform data mining on a target data set.

Furthermore, the software offering may be implemented using a client-server architecture. Components of the software offering may be deployed and executed on one or more servers (e.g., in a data center) and accessed from other machines using a locally installed executable, a command-line interface, and/or a web browser and network connection. In other words, the software offering may be implemented using a cloud computing system that is accessed over the Internet.

To enable execution of the software offering, users associated with the creation, deployment, and/or execution of the software offering may determine a set of requirements associated with the software offering. The users may then allocate resources (e.g., resource 1 122, resource m 124, resource 1 126, resource n 128) in the cloud computing system to components in the software offering and configure the allocated resources in a way that allows the executing software offering to meet the requirements. For example, a development team for the software offering may provide a policy specifying a level of availability, reliability, scalability, security, and/or response time in the software offering. Administrators for the cloud computing system may ensure compliance with the policy by allocating sufficient infrastructure resources to the software offering and/or configuring the resources to provide requisite levels of redundancy, security, and/or load balancing in the software offering.

Those skilled in the art will appreciate that the cloud computing system may use virtualization to deploy and execute the software offering on a set of shared resources. In particular, a number of orchestration tools (e.g., orchestration tool 1 118, orchestration tool z 120) may be used to virtualize and/or provision different types of resources in the cloud computing system. For example, a virtual machine monitor may allocate and/or manage computing resources by creating and executing virtual machines as abstractions of physical servers. Similarly, a virtual filer may combine storage resources from a variety of storage devices into a resource pool and allocate logical volumes of storage from the resource pool. Finally, network routers and/or switches may partition network resources into virtual local area networks (VLANs) that connect physical and/or virtual computing and/or storage resources in the cloud computing system.

Moreover, each orchestration tool may include functionality to dynamically reprovision resources in response to changes in the software offering and/or in demand for the resources. For example, a virtual machine monitor may instantiate a new virtual machine to enable the addition of a new web server to the software offering. The virtual machine monitor may also allocate a set of physical computing resources (e.g., processor, memory, etc.) to the virtual machine to enable execution of the web server on the resources. Finally, the virtual machine monitor may move the virtual machine to a different set of physical resources if the web server's resource requirements change and/or the physical resources (e.g., servers) used to execute the web server become overloaded.

In other words, the use of resources by the software offering may be managed by a number of disparate, independently acting orchestration tools. As a result, the cloud computing system may lack a comprehensive view of dependencies between software components in the software offering and the hardware resources used to execute the software components. For example, the cloud computing system may lose track of resources allocated to the software offering once the orchestration tools begin reallocating and/or reprovisioning the resources.

Such lack of dependency information may cause problems with tracking and managing events and/or failures in the cloud computing system. For example, a server outage in the cloud computing system may require manual intervention by administrators to determine the set of hardware and software components affected by the outage and/or perform corrective actions that enable recovery from the server outage.

In one or more embodiments, the system of FIG. 1 reduces complexity associated with managing requirements and dependencies in the software offering by creating a multidimensional model 108 of the software offering and using multidimensional model 108 to manage the deployment and execution of the software offering. As shown in FIG. 1, multidimensional model 108 may be created from a service definition 110 of the software offering and a resource definition 130 of resources available for use by the software offering.

Service definition 110 may be obtained from a user (e.g., developer, architect, etc.) associated with the creation and/or development of the software offering. More specifically, service definition 110 may correspond to a logical representation of the software offering in terms of the software offering's configuration, topology, policies, and/or QoS attributes. As a result, elements (e.g., element 1 112, element x 114) of service definition 110 may include one or more tiers, a set of service components, and/or a set of connections. For example, an architect of the software offering may provide service definition 110 by inputting the number of tiers, level of security, software-development-lifecycle stage, and/or software stack associated with the software offering into a user interface provided by management apparatus 102.

On the other hand, resource definition 130 may be obtained from administrators and/or orchestration tools of the cloud computing system and correspond to a logical representation and/or division of available infrastructure resources in the cloud computing system in terms of the resources' locations, states, and/or utilization. Elements (e.g., element 1 132, element y 134) of resource definition 130 may thus represent physical and/or virtual resources, resource clusters, security zones, hosting segments, and/or locations in the cloud computing system. For example, an administrator may manually populate resource definition 130 with an inventory of physical and/or virtual resources in the cloud computing system, or provisioning apparatus 116 may receive notifications of changes to resources (e.g., addition of new resources, removal of existing resources) in the cloud computing system from the orchestration tools (e.g., virtual machine monitors, virtual filers) and update resource definition 130 accordingly.

To create multidimensional model 108, modeling apparatus 104 may map a first set of elements (e.g., element 1 112, element x 114) from service definition 110 to a second set of elements (e.g., element 1 132, element y 134) from resource definition 130. The mappings may represent dependencies of the first set of elements on the second set of elements. For example, a mapping from a service component in service definition 110 to a resource in resource definition 130 may indicate the allocation of the resource to the service component by an orchestration tool. Creation of multidimensional models for software offerings is discussed in a co-pending non-provisional application by inventors Jerome Labat, Ramachandran Varadharajan, Wilson Lau, and Thomas Bishop, entitled "Multidimensional Modeling of Software Offerings," having Ser. No. 13/031,950, and filing date Feb. 22, 2011, which is incorporated herein by reference.

In one or more embodiments, the creation of multidimensional model 108 involves the identification of a set of requirements associated with the software offering from service definition 110, as well as the subsequent allocation of a subset of the resources from resource definition 130 to service components in service definition 110 based on the requirements. In particular, management apparatus 102 may determine the software offering's requirements from a set of policies in service definition 110 and store the requirements in a work-breakdown structure 106. The policies may include a software-development-lifecycle policy, a security policy, a software-template policy, a QoS policy, and/or a structural policy. The requirements may thus specify the amount and/or configuration of resources required to satisfy the policies.

Next, provisioning apparatus 116 may use work-breakdown structure 106 to automatically provision a set of resources for use by the software offering without requiring manual configuration of the resources by a user (e.g., administrator). For example, provisioning apparatus 116 may use work-breakdown structure 106 to create a set of service containers for hosting the software offering. Provisioning apparatus 116 may then allocate resources to the service containers by requesting the required amounts and/or configurations of resources from the corresponding orchestration tools. Automatic provisioning of resources to software offerings is discussed in a co-pending non-provisional application by inventors Jerome Labat, Ramachandran Varadharajan, Wilson Lau, and Thomas Bishop, entitled "Automatic Provisioning of Resources to Software Offerings," having Ser. No. 13/031,968, and filing date Feb. 22, 2011, which is incorporated herein by reference.

As mentioned previously, multidimensional model 108 may include dependencies between service components in service definition 110 and resources in resource definition 130. Consequently, modeling apparatus 104 may create multidimensional model 108 by mapping resources allocated by provisioning apparatus 116 to the service components to which the resources were allocated.

Modeling apparatus 104 may also update the mappings based on changes to the provisioned resources. For example, resources provisioned to service components may change as the orchestration tools allocate new resources, deallocate currently allocated resources, and/or use different sets of physical resources to execute virtualized resources (e.g., virtual machines, logical volumes, VLANs, etc.). Such changes may be obtained by provisioning apparatus 116 through querying and/or monitoring of the orchestration tools. The changes may also be used by provisioning apparatus 116 to update resource definition 130. The updates may then be propagated to multidimensional model 108 via modeling apparatus 104.

Because multidimensional model 108 contains an up-to-date representation of service components, resources, and dependencies in the software offering, the system of FIG. 1 may facilitate management of the software offering within the cloud computing system. For example, multidimensional model 108 may facilitate the automatic deployment of the software offering on the allocated resources, identification of resources allocated to the software offering, identification of failures during execution of the software offering, and/or management of changes associated with the software offering or the resources. In other words, the creation and update of multidimensional model 108 may reduce complexity and/or overhead associated with configuration management, fault diagnosis and remediation, deployment, and/or resource provisioning in the software offering.

In one or more embodiments, the system of FIG. 1 includes functionality to perform dependency-based impact analysis of the software offering using multidimensional model 108. During the dependency-based impact analysis, model data associated with multidimensional model 108 is obtained and used to calculate a set of dependency scores representing levels of dependency among the service components and/or resources used by the software offering. As discussed below with respect to FIGS. 2-3, the dependency scores may correspond to centrality scores for a set of nodes in multidimensional model 108. For example, the centrality scores may be calculated by obtaining an adjacency matrix for the set of nodes, calculating an eigenvector associated with a greatest eigenvalue of the adjacency matrix, and obtaining the centrality scores from a set of elements in the eigenvector.

In addition, updates to multidimensional model 108 may be used to recalculate the dependency scores so that the dependency scores represent up-to-date levels of dependency among the service components and/or resources. In particular, provisioning apparatus 116 may obtain execution data for the software offering from one or more of the orchestration tools and update multidimensional model 108 (e.g., using modeling apparatus 104) based on the execution data. For example, provisioning apparatus 116 may use execution data associated with a change in a number of service containers allocated to the software offering, a resizing of a service container allocated to the software offering, and/or a relocation of the service container to update resource definition 130. The updates may be used by modeling apparatus 104 to change the mappings between elements of multidimensional model 108. The changes may then be obtained from multidimensional model 108 and used to recalculate the dependency scores.

The dependency scores may also be used to facilitate management of the software offering. In particular, the dependency scores may be used to determine a set of recovery costs and/or a recovery sequence for the software offering. For example, the recovery sequence may correspond to a decreasing sequence of the dependency scores to prioritize the restoration of service components and/or resources associated with higher levels of dependency. Consequently, the disclosed embodiments may increase use of multidimensional model 108 in managing the software offering across the software development lifecycle of the software offering.

Figure 2:
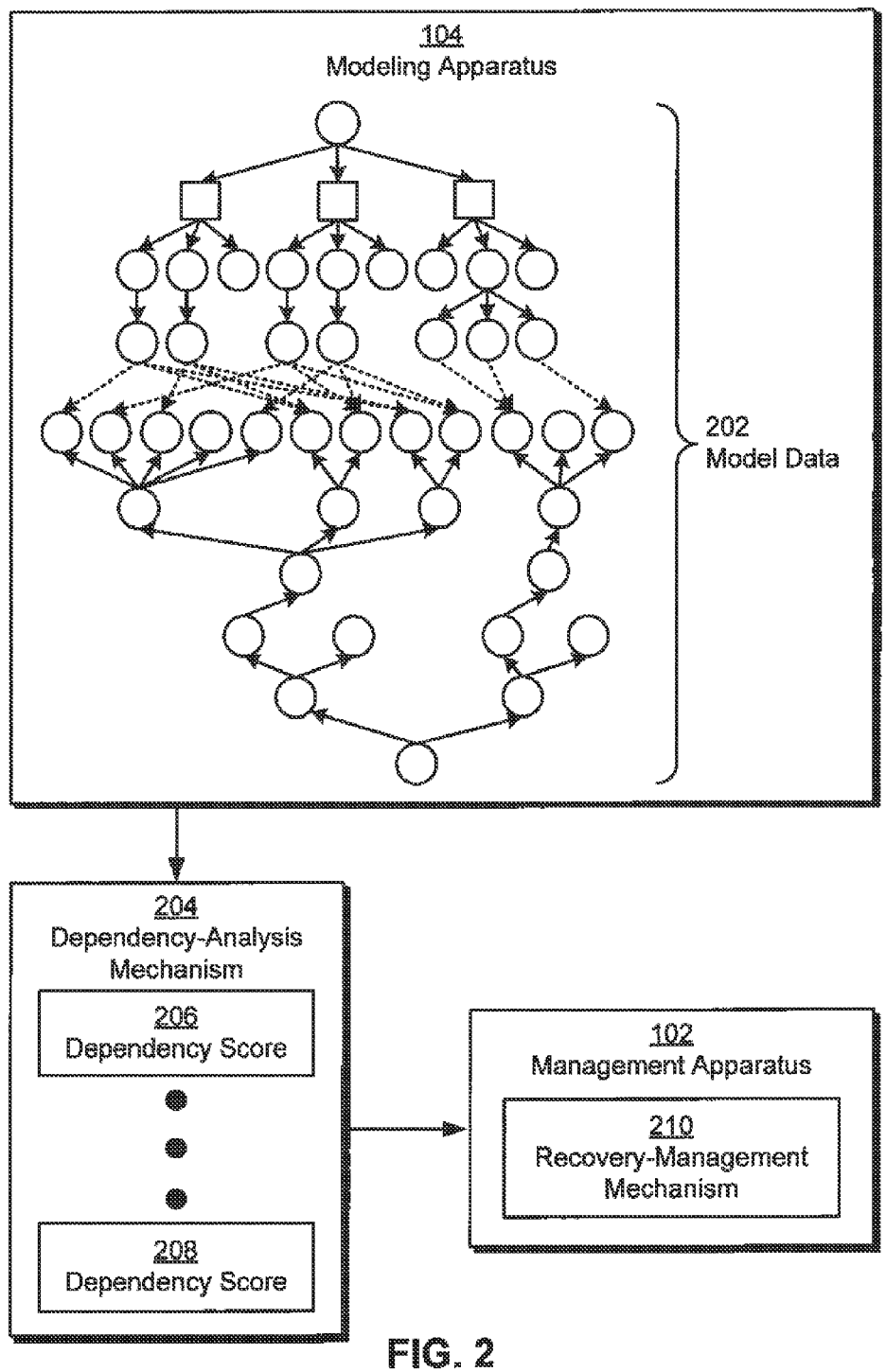
FIG. 2 shows a system for performing dependency-based impact analysis of a software offering in accordance with an embodiment.

FIG. 2 shows a system for performing dependency-based impact analysis of a software offering in accordance with an embodiment. As shown in FIG. 2, model data 202 associated with a multidimensional model (e.g., multidimensional model 108 of FIG. 1) of a software offering is provided by modeling apparatus 104. Model data 202 may be also be provided by a data-management mechanism for the multidimensional model, such as a relational database.

Model data 202 may then be used by a dependency-analysis mechanism 204 to calculate a set of dependency scores 206-208 representing levels of dependency among a set of service components and/or resources used by the software offering. Dependency-analysis mechanism 204 may be provided by modeling apparatus 104, management apparatus 102, and/or another component with access to model data 202.

In one or more embodiments, dependency scores 206-208 are calculated as a set of centrality scores for a set of nodes in the multidimensional model. Each centrality score may be proportional to the number of connections associated with the corresponding node in the multidimensional model. Because each incoming connection to a node represents a dependency on the service component and/or resource represented by the node, a high centrality score for the node may indicate a high level of dependency on the service component and/or resource by other service components and/or resources. For example, nodes with large numbers of incoming connections may be associated with higher centrality scores than nodes with small numbers of incoming connections. In addition, nodes with high centrality scores may contribute more to the centrality score of a node with incoming connections from the nodes than nodes with low centrality scores.

In one or more embodiments, the centrality scores are calculated by obtaining an adjacency matrix for the set of nodes, calculating an eigenvector associated with a greatest eigenvalue of the adjacency matrix, and obtaining the centrality scores from a set of elements in the eigenvector. In other words, each centrality score may correspond to an eigenvector centrality of the corresponding node, as discussed in further detail below with respect to FIG. 3. Alternatively, the centrality scores may be calculated using other types of centrality measures, such as degree centrality and/or betweenness centrality.

Once dependency scores 206-208 are calculated (e.g., as centrality scores), dependency scores 206-208 may be used by management apparatus 102 to facilitate management of the software offering. More specifically, a recovery-management mechanism 210 in management apparatus 102 may use dependency scores 206-208 to determine a set of recovery costs associated with the service components and/or resources. Each recovery cost may represent the time and/or overhead associated with recovery of the corresponding service component and/or resource. Because recovery time and/or overhead may increase with the number of dependencies, the recovery costs may be proportional to dependency scores 206-208. For example, recovery-management mechanism 210 may calculate a recovery cost for a service component and/or resource in the software offering by using the dependency score (e.g., dependency scores 206-208) for the service component and/or resource as the input to an exponential function. As a result, the calculated recovery cost (e.g., recovery time and/or overhead) for a software component and/or resource may grow exponentially with the level of dependency associated with the software component and/or resource.

Recovery-management mechanism 210 may also use dependency scores 206-208 to determine a recovery sequence for the software offering. The recovery sequence may specify the order of recovery of service components and/or resources in the event of an outage and/or disaster. In addition, the recovery sequence may correspond to a decreasing sequence of the recovery costs and/or dependency scores 206-208 to prioritize the restoration of service components and/or resources with higher levels of dependency. The recovery sequence may thus reduce the downtime associated with widely used service components and/or resources, and in turn, reduce the number of missed transactions resulting from an outage and/or disaster affecting the software offering.

Figure 3:
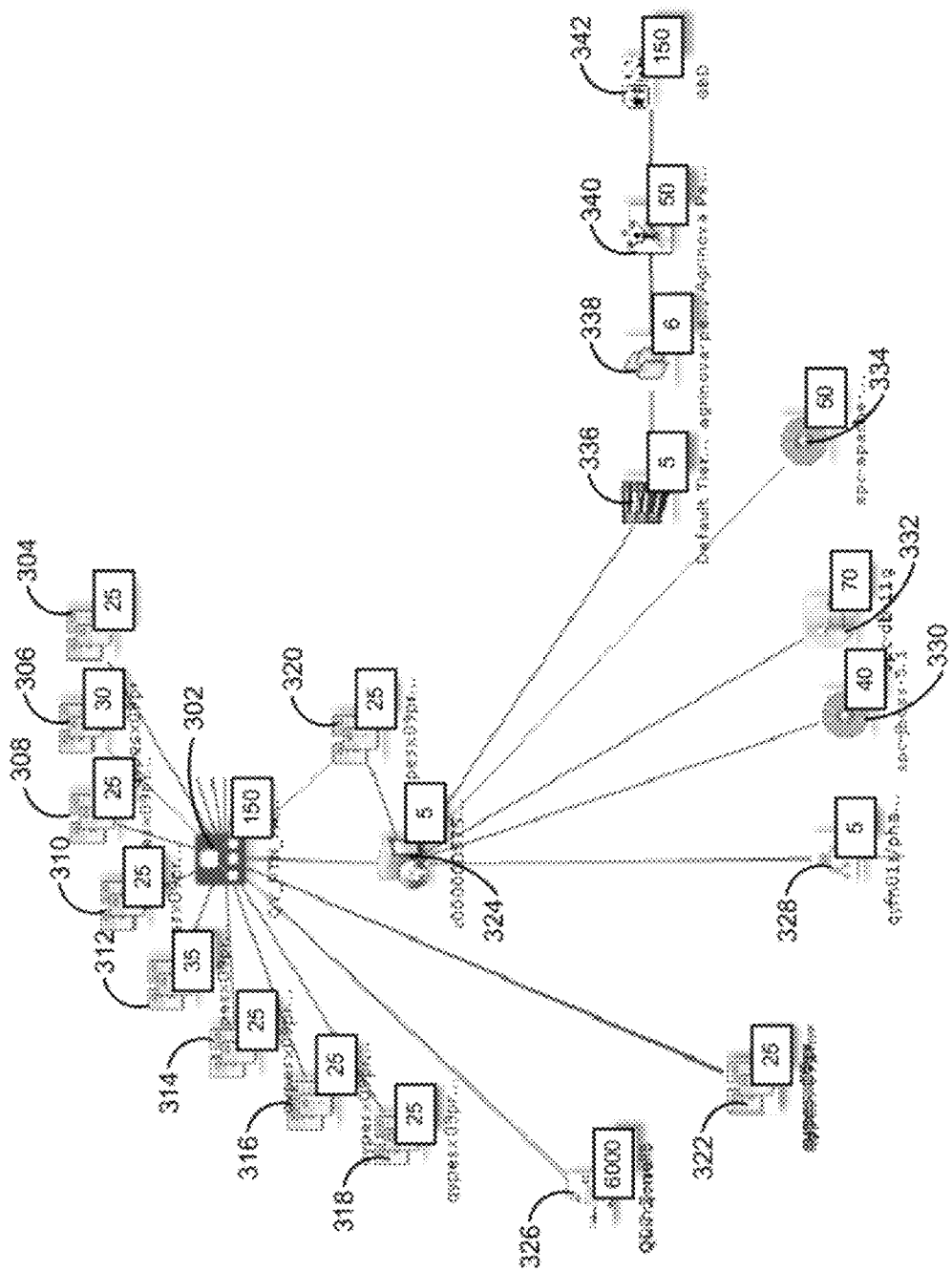
FIG. 3 shows an exemplary set of nodes in a multidimensional model of a software offering in accordance with an embodiment.

FIG. 3 shows an exemplary set of nodes 302-342 in a multidimensional model of a software offering in accordance with an embodiment. Nodes 302-342 may represent service components and/or resources used by the software offering. For example, node 302 may represent a resource cluster, nodes 304-322 may represent physical hosts in the resource cluster, node 324 may represent a virtual machine executing on one of the physical hosts, and node 326 may represent a hosting segment containing the resource cluster. In addition, node 328 may represent network storage used by the virtual machine, nodes 330-334 may represent service components (e.g., web server, application server, database) in a software stack, and node 336 may represent a tier in the software offering. Finally, node 338 may represent an execution environment for the software offering, node 340 may represent a project to which the software offering belongs, and node 342 may represent a business unit associated with the project.

Furthermore, connections between nodes 302-342 may represent dependencies among the service components and/or resources represented by nodes 302-342. For example, a connection between node 324 and node 320 may represent a dependence of the virtual machine represented by node 324 on the physical host represented by node 320. Similarly, connections between nodes 304-322 and node 302 may indicate dependencies between physical hosts represented by nodes 304-322 and the resource cluster represented by node 302.

In turn, the connections may be used to calculate a set of centrality scores for nodes 302-342. As mentioned previously, the centrality scores may correspond to eigenvector centralities that represent the relative importance of nodes 302-342 in relation to one another. More specifically, the eigenvector centralities may measure the "breadth" of nodes 302-342, with connections to nodes associated with high centrality scores contributing more to the centrality score of a given node than connections to nodes associated with low centrality scores.

To calculate the centrality scores, an adjacency matrix may be obtained for nodes 302-342. For example, the adjacency matrix may correspond to a 21-by-21 matrix in which an element $A_{ij}$ of the matrix is set to 1 if a connection exists from the $i^{th}$ node to the $j^{th}$ node in the multidimensional model. On the other hand, the adjacency matrix may correspond to a stochastic matrix in which the values of elements in each column of the adjacency matrix sum to 1. Moreover, the size of the adjacency matrix may be adjusted as nodes are added to and/or removed from the multidimensional model.

Next, an eigenvector associated with the greatest eigenvalue of the adjacency matrix may be calculated. The eigenvector and/or eigenvalue may be calculated using an iterative technique such as a power-iteration technique, or the eigenvector and/or eigenvalue may be calculated using an algebraic technique.

Finally, the centrality scores may be obtained from a set of elements in the eigenvector. In particular, the eigenvector associated with the greatest eigenvalue may contain positive real numbers and the same number of elements as the number of nodes 302-342 in the multidimensional model. The $i^{th}$ element of the eigenvector may thus correspond to the centrality score for the $i^{th}$ node in the multidimensional model.

As shown in FIG. 3, each node 302-342 is associated with a centrality score reflecting the relative importance of the node in the multidimensional model. For example, node 302 may have a high centrality score of "150" because a large number of physical hosts represented by nodes 304-322 have dependencies on (e.g., belong to) the resource cluster represented by node 302. The connection of node 302 and/or other nodes with high centrality scores to node 326 may then cause node 326 to have the highest centrality score (e.g., "6000") in the multidimensional model. On the other hand, other nodes (e.g., nodes 304-324, node 328, nodes 336-340) may have relatively low centrality scores compared to node 302 or node 326 because the other nodes may be associated with relatively few and/or unimportant connections from other nodes.

After the centrality scores are calculated, the centrality scores may be used as a set of dependency scores representing levels of dependency among the service components and/or resources represented by nodes 302-342. The dependency scores may then be used to facilitate management of the software offering.

First, the centrality and/or dependency scores may be used to determine a set of recovery costs associated with the service components and/or resources. Each recovery cost may reflect the amount of time and/or overhead associated with recovering the corresponding service component and/or resource from a failure. As a result, a service component and/or resource with a high dependency score may also be associated with a high recovery cost. For example, a failure in a first resource with a high dependency score may cause failures in multiple service components and/or resources that depend on the first resource. As a result, recovering from the failure may require the restoration of the first resource, as well as the restoration of the service components and/or resources with dependencies on the resource. Conversely, a failure in a second resource with a low dependency score may cause few to no failures in other service components and/or resources and thus require less recovery time and/or effort than the failure in the first resource.

Next, the centrality and/or dependency scores may be used to determine a recovery sequence for the software offering. The recovery sequence may correspond to a decreasing sequence of the centrality and/or dependency scores. For example, the recovery sequence may specify the recovery of the physical host represented by node 312 before the recovery of the physical host represented by node 310 because recovery of physical host 312 may enable the restoration of seven virtual machines, while the recovery of physical host 310 may enable the restoration of only five virtual machines. In other words, the recovery sequence may reduce the number of missed transactions associated with an outage and/or disaster affecting the software offering by reducing the downtime associated with service components and/or resources on which large numbers of other service components, resources, and/or software offerings depend.

Figure 4:
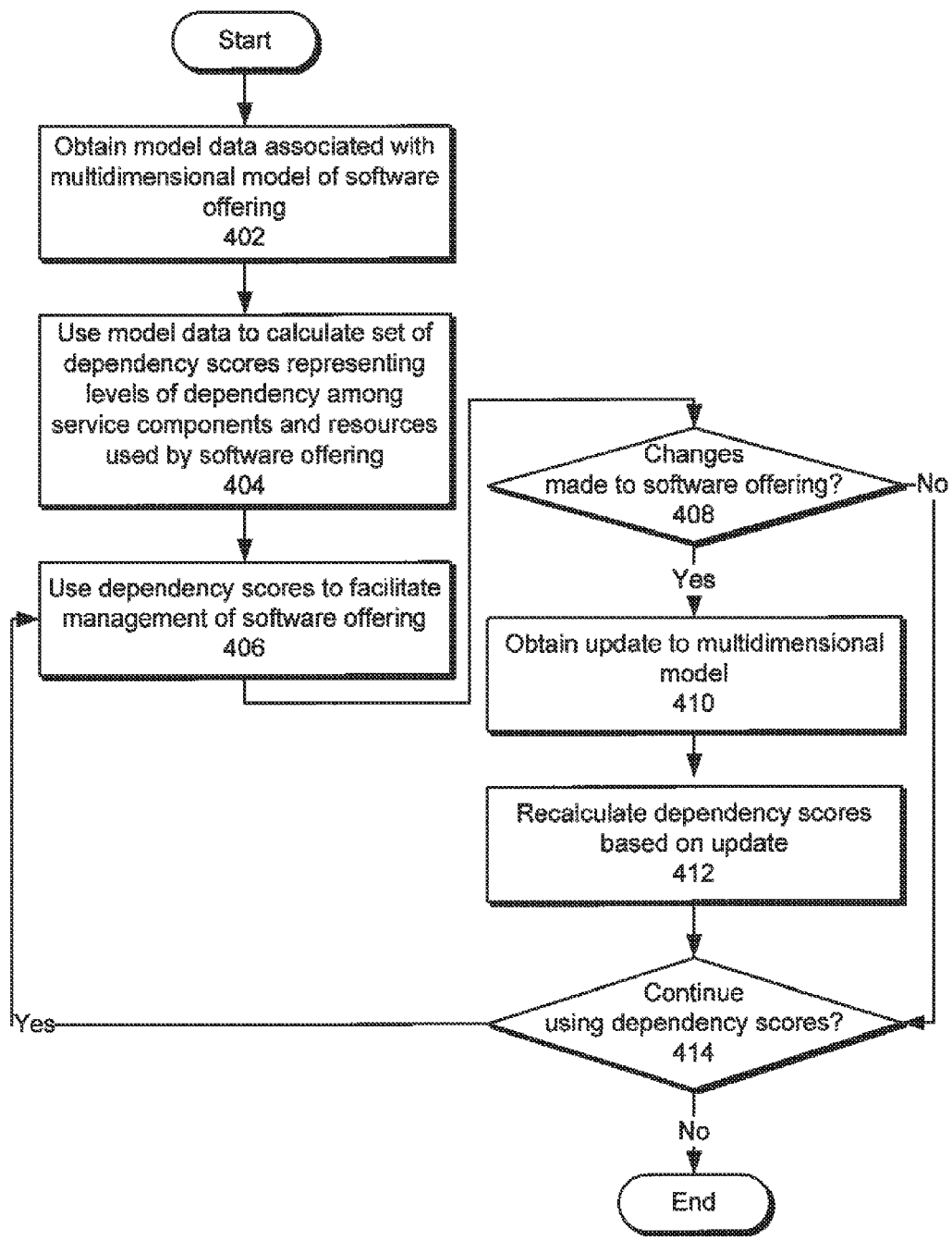
FIG. 4 shows a flowchart illustrating the process of facilitating the maintenance and execution of a software offering in accordance with an embodiment.

FIG. 4 shows a flowchart illustrating the process of facilitating the maintenance and execution of a software offering in accordance with an embodiment. In one or more embodiments, one or more of the steps may be omitted, repeated, and/or performed in a different order. Accordingly, the specific arrangement of steps shown in FIG. 4 should not be construed as limiting the scope of the technique.

Initially, model data associated with a multidimensional model of the software offering is obtained (operation 402). The model data may be provided by a modeling apparatus (e.g., modeling apparatus 104 of FIG. 1) and/or by a data-management mechanism such as a relational database. Next, the model data is used to calculate a set of dependency scores representing levels of dependency among a set of service components and a set of resources used by the software offering (operation 404).

The dependency scores may be calculated by calculating a set of centrality scores for a set of nodes in the multidimensional model and using the set of centrality scores as the set of dependency scores. For example, the dependency scores may correspond to eigenvector centralities that are calculated by obtaining an adjacency matrix for the set of nodes, calculating an eigenvector associated with the greatest eigenvalue of the adjacency matrix, and obtaining the eigenvalue centralities from elements of the eigenvector. In addition, the eigenvector may be calculated using an iterative technique and/or an algebraic technique.

The dependency scores may then be used to facilitate management of the software offering (operation 406). For example, the dependency scores may be used to determine a set of recovery costs associated with the service components and/or resources. The dependency scores may also be used to determine a recovery sequence for the software offering.

Changes may also be made to the software offering during use of the dependency scores in managing the software offering (operation 408). For example, service containers in the software offering may change in number, size, and/or location in response to changes in the software offering's policies and/or the availability of the resources. If changes have been made to the software offering, an update to the multidimensional model is obtained (operation 410), and the dependency scores are recalculated based on the update (operation 412). If changes have not been made to the software offering, the dependency scores are not recalculated.

The dependency scores may continue to be used (operation 414). For example, the dependency scores may continue to facilitate management of the software offering throughout the software development lifecycle of the software offering. If the dependency scores are to be used, the dependency scores are used to facilitate management of the software offering (operation 406), and changes to the software offering (operation 408) are reflected in the dependency scores (operations 410-412). The dependency scores may thus enable management of the software offering using an up-to-date representation of levels of dependencies among service components and/or resources in the software offering.

Figure 5:
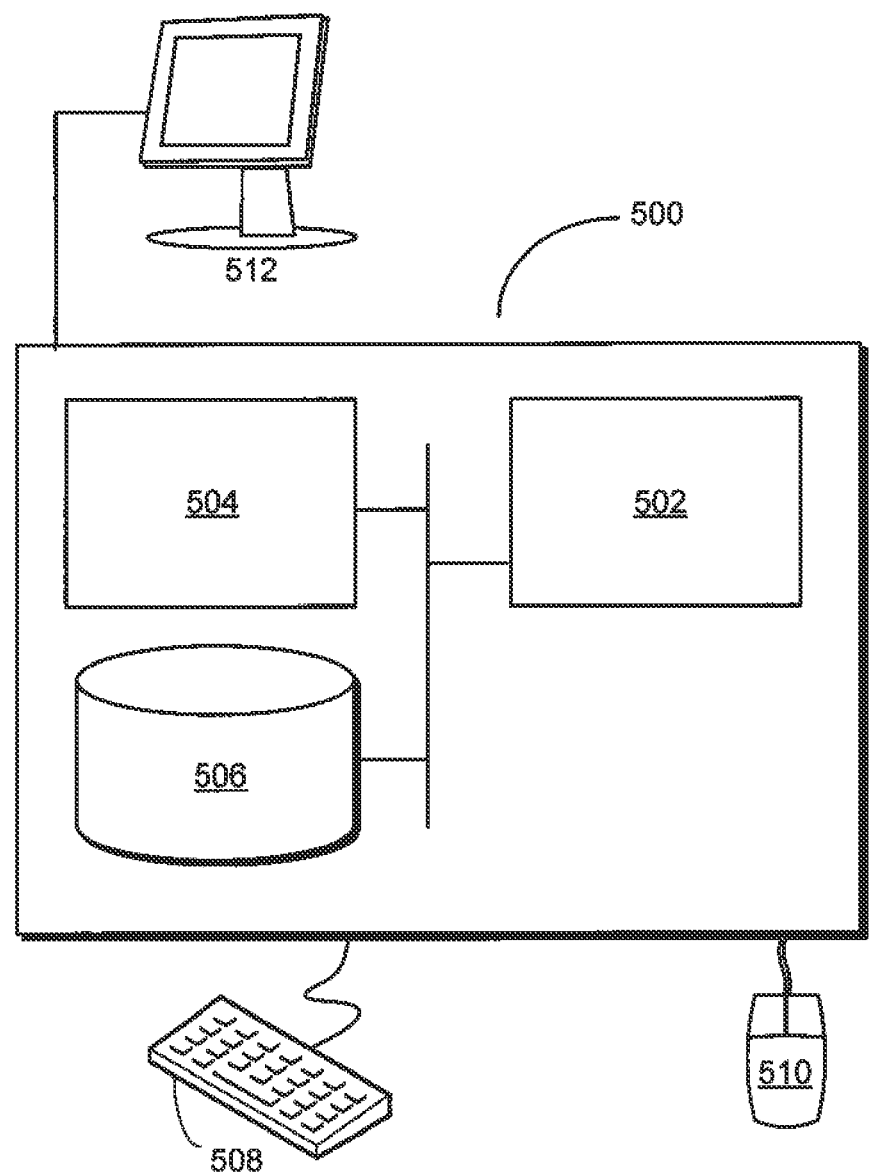
FIG. 5 shows a computer system in accordance with an embodiment.

FIG. 5 shows a computer system 500 in accordance with an embodiment. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating the maintenance and execution of a software offering. The system may include a dependency-analysis mechanism that obtains model data associated with a multidimensional model of the software offering and uses the model data to calculate a set of dependency scores representing levels of dependency among a set of service components and a set of resources used by the software offering. The system may also include a management apparatus that uses the dependency scores to facilitate management of the software offering.

In addition, one or more components of computer system 500 may be remotely located and connected to the other components over a network. Portions of the present embodiments (e.g., dependency-analysis mechanism, management apparatus, etc.) may also be located on different nodes of a distributed system that implements the embodiments. For example, the present embodiments may be implemented using a cloud computing system that manages the deployment, execution, and maintenance of a software offering.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating the maintenance and execution of a software offering, comprising:
obtaining, by computer, model data associated with a multidimensional model of the software offering;
using the model data to calculate, by computer, a set of dependency scores representing levels of dependency among a set of service components and a set of resources used by the software offering by:
calculating a set of centrality scores for a set of nodes in the multidimensional model, and
using the set of centrality scores as the set of dependency scores;
using the dependency scores to facilitate, by computer, management of the software offering by:
using the dependency scores to determine a set of recovery costs associated with the service components and the resources, and
using the dependency scores to determine a recovery sequence for the software offering, wherein the recovery sequence corresponds to a decreasing sequence of the dependency scores; and
presenting, by computer, the recovery sequence for the software offering to an administrator.

2. The computer-implemented method of claim 1, further comprising:
obtaining an update to the multidimensional model; and
recalculating the dependency scores based on the update.

3. The computer-implemented method of claim 1, wherein calculating the set of centrality scores for the set of nodes in the multidimensional model involves:
obtaining an adjacency matrix for the set of nodes;
calculating an eigenvector associated with a greatest eigenvalue of the adjacency matrix; and
obtaining the centrality scores from a set of elements in the eigenvector.

4. The computer-implemented method of claim 3, wherein the eigenvector is calculated using at least one of an iterative technique and an algebraic technique.

5. A system for facilitating the maintenance and execution of a software offering, comprising:
a memory;
a processor;
a dependency-analysis mechanism configured to:
obtain model data associated with a multidimensional model of the software offering; and
use the model data to calculate a set of dependency scores representing levels of dependency among a set of service components and a set of resources used by the software offering by:
calculating a set of centrality scores for a set of nodes in the multidimensional model, and
using the set of centrality scores as the set of dependency scores; and
a management apparatus configured to use the dependency scores to facilitate management of the software offering by:

using the dependency scores to determine a set of recovery costs associated with the service components and the resources, using the dependency scores to determine a recovery sequence for the software offering, wherein the recovery sequence corresponds to a decreasing sequence of the dependency scores, and presenting the recovery sequence for the software offering to an administrator.

6. The system of claim 5, wherein the dependency-analysis mechanism is further configured to:
obtain an update to the multidimensional model; and
recalculate the dependency scores based on the update.

7. The system of claim 5, wherein calculating the set of centrality scores for the set of nodes in the multidimensional model involves:
obtaining an adjacency matrix for the set of nodes;
calculating an eigenvector associated with a greatest eigenvalue of the adjacency matrix; and
obtaining the centrality scores from a set of elements in the eigenvector.

8. The system of claim 7, wherein the eigenvector is calculated using at least one of an iterative technique and an algebraic technique.

9. A non-transitory computer-readable storage medium storing instructions that when executed by a computer cause the computer to perform a method for facilitating the maintenance and execution of a software offering, the method comprising:
obtaining model data associated with a multidimensional model of the software offering;
using the model data to calculate a set of dependency scores representing levels of dependency among a set of service components and a set of resources used by the software offering by:
calculating a set of centrality scores for a set of nodes in the multidimensional model, and
using the set of centrality scores as the set of dependency scores; and
using the dependency scores to facilitate management of the software offering by:
using the dependency scores to determine a set of recovery costs associated with the service components and the resources, and
using the dependency scores to determine a recovery sequence for the software offering, wherein the recovery sequence corresponds to a decreasing sequence of the dependency scores; and
presenting the recovery sequence for the software offering to an administrator.

10. The non-transitory computer-readable storage medium of claim 9, the method further comprising:
obtaining an update to the multidimensional model; and
recalculating the dependency scores based on the update.

11. The non-transitory computer-readable storage medium of claim 9, wherein calculating the set of centrality scores for the set of nodes in the multidimensional model involves:
obtaining an adjacency matrix for the set of nodes;
calculating an eigenvector associated with a greatest eigenvalue of the adjacency matrix; and
obtaining the centrality scores from a set of elements in the eigenvector.

12. The non-transitory computer-readable storage medium of claim 11, wherein the eigenvector is calculated using at least one of an iterative technique and an algebraic technique.

* * * * *